US008417786B2

(12) United States Patent  
Colbert et al.

(10) Patent No.: US 8,417,786 B2
(45) Date of Patent: Apr. 9, 2013

(54) METHODS AND SYSTEMS FOR AGGREGATING PRESENCE INFORMATION TO PROVIDE A SIMPLIFIED UNIFIED PRESENCE

(75) Inventors: Michael Colbert, Debary, FL (US); Michael Gray, Montclair, NJ (US); Yongqian Zheng, Encino, CA (US); Shen-Yuan Michael Yap, Woodland Hills, CA (US)

(73) Assignee: Research In Motion Limited, Waterloo (CA)

( * ) Notice: Subject to any disclaimer, the term of this patent is extended or adjusted under 35 U.S.C. 154(b) by 1116 days.

(21) Appl. No.: 12/235,929

(22) Filed: Sep. 23, 2008

(65) Prior Publication Data

US 2010/0075673 A1 Mar. 25, 2010

(51) Int. Cl.
*G06F 15/16* (2006.01)
(52) U.S. Cl. ....................................... 709/206
(58) Field of Classification Search .............. 709/202, 709/206, 207
See application file for complete search history.

(56) References Cited

U.S. PATENT DOCUMENTS

| 2002/0143876 | A1* | 10/2002 | Boyer et al. ............... 709/205 |
| 2003/0217098 | A1* | 11/2003 | Bobde et al. ............... 709/202 |
| 2006/0034430 | A1 | 2/2006 | Liakis |
| 2006/0159067 | A1 | 7/2006 | Chen et al. |

OTHER PUBLICATIONS

Valsala, Kavitha, "Enabling Network Based Presence Aggregation using IMS", IP Multimedia Subsystem Architecture and Applications, 2007 International Conference on, IEEE, Piscataway, NJ, Dec. 6, 2007, XP031283327, ISBN: 978-1-4244-2671-3.
Rosenberg, J., "A Data Model for Presence; rfc4479.txt", IETF Standard, Internet Engineering Task Force, IETF, CH, Jul. 1, 2006, XP015054986, ISSN: 0000-0003.
Sugano, H. et al. "Presence Information Data Format (PIDF); rfc3863.txt", IETF Standard, Internet Engineering Task Force, IETF, CH, Aug. 1, 2004, XP015009641, ISSN: 0000-0003.
Schulzrinne, H. et al, "RPID: Rich Presence Extensions to the Presence Information Data Format (PIDF); rfc4480.txt", IETF Standard, Internet Engineering Task Force, IETF, CH, Jul. 1, 2006, XP015054987, ISSN: 0000-0003.

(Continued)

*Primary Examiner* — Larry Donaghue
*Assistant Examiner* — Marshall McLeod
(74) *Attorney, Agent, or Firm* — Novak Druce Connolly Bove + Quigg LLP (57) ABSTRACT

Methods and systems for providing simplified presence for a user are described. The user has a plurality of associated communication devices registered with a communications server, and each communication device enables at least one communication service class. The server has a user data entry associating the user with each of the plurality of communication devices. To hide the details of the user-associated devices from third parties, a virtual device is defined and associated with the user. Presence information received at the server from the various devices is aggregated together to create aggregated presence information that indicates at least the service classes available from the user-associated devices based on the received presence information. A virtual device presence document is generated containing the aggregated presence information and is provided to a presence server as presence information associated with the user.

16 Claims, 4 Drawing Sheets

OTHER PUBLICATIONS

Extended European Search Report mailed Dec. 17, 2008, in corresponding European patent application No. 08164882.6.

Valsala K. ED—Anonymous: "Enabling network based presence aggregation using IMS" IP multimedia subsystem architecture and applications, 2007 international conference on, IEEE, Piscataway, NJ, USA, Dec. 6, 2007, pp. 1-5, XP031283327 ISBN:978-1-4244-2671-3.

Schulzrinne Columbia U V Gurbani Lucent P Kyzivat J. Rosenberg Cisco H: RPID: rich Presence Extensions to the Presence Information Data Format rfc4480.txt IETF Standard, Internet Engineering task Forcem IETF, CH, Jul. 1, 2006, XP015054987 ISSN:0000-0003.

Rosenberg Cisco Systems J: A Data model for presence; rfc4479.txt IETF standard , internet engineering task force, IETF, CH, Jul. 1, 2006, XP015054986 ISSN:0000-0003.

Sugano S. Fujimoto Fujitsu G Klyne Nine by Nine a bateman visiontech W. Carr Intel J. Peterson Neustar H: Presence Information data format (PIDF); rfc3863.txt IETF Standard, Internet Engineering task force, IETF, CH, Aug. 1, 2004, XP015009641 ISSN:0000-0003.

* cited by examiner

FIG. 5

METHODS AND SYSTEMS FOR AGGREGATING PRESENCE INFORMATION TO PROVIDE A SIMPLIFIED UNIFIED PRESENCE

FIELD

The present application relates to methods, systems, and devices for providing simplified presence information for a user.

BACKGROUND

One of the trends in communications is toward providing enriched presence information to third parties regarding a user's availability. For example, H. Schulzrinne, "RPID: Rich Presence Extensions to the Presence Information Data Format (PIDF)", RFC 4480, July 2006, describes extensions to presence models that enable dissemination of a user's "mood" and "activities". Under such trends, third parties subscribing to a user's presence information may expect to receive a large quantity of data regarding the user.

Another trend in modern communications is toward the use of multiple devices for communications, and often for some of the same types of services. Many users have a home telephone, work telephone, one or more personal computers, one or more mobile devices, fax machines, and other such user devices. Any one of these user devices may provide multiples services. For example, a user may use his or her home telephone, work telephone, mobile devices, and, in some cases, personal computer to place or receive voice calls. In some cases those voice calls may be placed as conventional PSTN circuit-switched calls, cellular wireless calls, VoIP calls, etc., or combinations of these. Even VoIP calls may be made over different types of network connections, including WAN, WLAN, DSL, etc.

A complication that arises in the context of rich presence information with regard to multiple devices is that third parties may be given an excessive amount of information regarding the various devices on which the user may be available. This places the onus on the third party to decipher the presence information and select an appropriate device to which to direct a message or session request.

It would be advantageous to provide for improved methods and systems for simplifying presence in a multi-device context.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application describes a method of providing simplified presence for a user, the user having a plurality of associated communication devices and being registered with a communications server, each communication device enabling at least one communication service class, and the communications server having a user data entry associating the user with each of the plurality of communication devices. The method includes defining a virtual device associated with the user; receiving, at the communications server, presence information from at least two of the plurality of communication devices; aggregating the received presence information, the aggregated presence information indicating the service classes available from the aggregated at least two communication devices based on the received presence information; generating a virtual device presence document containing the aggregated presence information; and providing the virtual device presence document to a presence server as presence information associated with the user.

In another aspect, the present application describes a communications server for providing simplified presence for a user, the user having a plurality of associated communication devices, and each communication device enabling at least one communication service class. The communications server includes a network interface for connecting the server to an IP network; a memory storing a user data entry associating the user with each of the plurality of communication devices, and storing a virtual device definition in association with the user; a processor; and a presence manager executable by the processor. The presence manager is configured to receive presence information from at least two of the plurality of communication devices, aggregate the received presence information, the aggregated presence information indicating the service classes available from the aggregated at least two communication devices based on the received presence information, generate a virtual device presence document containing the aggregated presence information, and provide the virtual device presence document to a presence server as presence information associated with the user.

Embodiments of the present application are not limited to any particular operating system, mobile device architecture, server architecture, or computer programming language. Many of the example embodiments described herein relate to mobile devices; however, it will be appreciated that the present application is not limited to mobile devices and has application to a variety of user devices.

Reference is made herein to a "service class". The term "service class" as used in this application is not necessarily related to the <service-class> tuple described in H. Schulzrinne, "RPID: Rich Presence Extensions to the Presence Information Data Format (PIDF)", RFC 4480, July 2006, at section 3.10. The term "service class" in the present application may, in some embodiments, make use of the <class> element described by Schulzrinne at section 3.3, but not necessarily.

Figure 1:
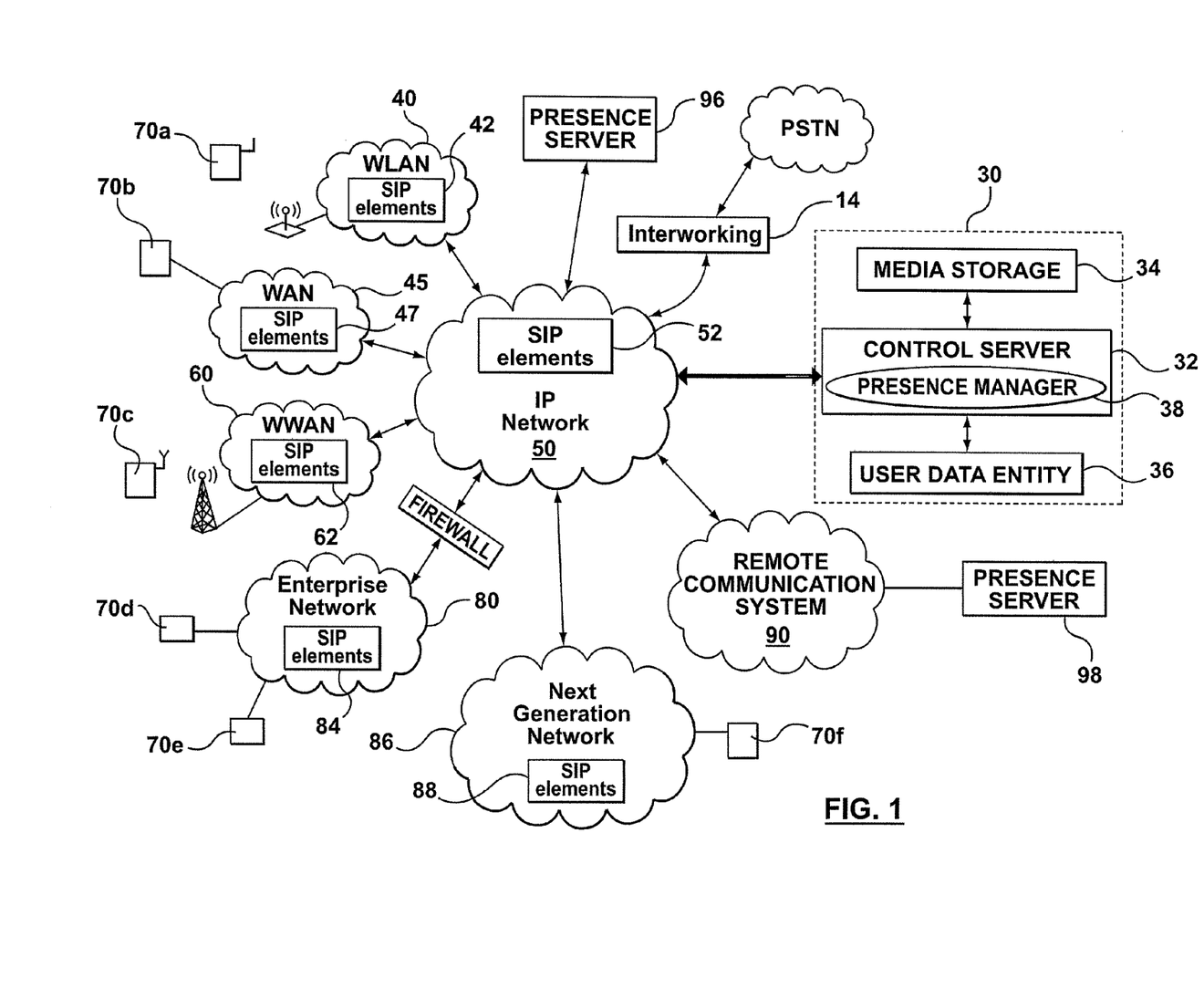
FIG. 1 diagrammatically shows an example communication system.

Reference is first made to FIG. 1, which diagrammatically shows an example communication system 10. As will be discussed below, the system 10 provides for a full integration of local and remote IP-based communication devices, such as communication devices 70 (shown individually as 70a, ..., 70f). In this example, the communication devices 70 include any device capable of IP-based communications. In one embodiment, the device 70a may be a mobile device configured to connect with a wireless local area network (WLAN) 40 through an access point using, for example, any one of the IEEE 802.11 suite of communications protocols. In another embodiment, the device 70b may be a personal computer or computing device including a Ethernet card configured to connect to an wide area network (WAN) 45, for example via an internet service provider (ISP). In another embodiment, the device 70c may be a wireless mobile device configured to connect with a wireless wide area network (WWAN) 60 using any one or more of a number of radio protocols, such as GSM/GPRS/EDGE, UMTS, CDMA, WiMAX, etc. In yet other embodiments, an enterprise network 80 may include devices such as a digital desktop telephone set 70d and/or a personal computer 70e. Device 70f may be an IP-enabled home phone, for example, or another device configured to operated within a Next Generation Network (NGN) 86, such as TISPAN NGN or HFC cable networks. Other communications devices 70 capable of IP-based messaging or session-based communications will be understood by those skilled in the art. It will be appreciated that combinations of these various embodiments (e.g., a home telephone, with business telephone and wireless mobile devices linked via IP to the same core network) are also possible.

Some of the devices 70 may be configured for messaging applications. Messaging applications may include text-based messaging, including SMS, E-mail, Instant Messaging (IM), etc., but may also include multi-media messaging, including images, video and/or audio. Some of the devices 70 may alternatively or additionally be configured for session-based communications. Session-based communications may include voice-over-IP (VoIP), but may also include chat, some IM services, Push-to-talk over Cellular (PoC), some webcasting, video conferencing, and other such multi-media services.

In the embodiment shown in FIG. 1, the devices 70 are SIP-compliant. The devices 70 are capable of sending and receiving SIP message requests and responses to set up, tear down, and manage session-based communications. In other words, the compliant devices 70 are configured as SIP User Agents. Nevertheless, it will be appreciated that the present application is not necessarily limited to SIP-based embodiments. In some other embodiments (not shown), the devices may conform to another standard for session management.

In the present example embodiment, a user is associated with two or more devices 70. For example, the user may be associated with devices 70a, 70b, 70c, 70d, 70e, and 70f. The particular user has a unique user address that the user may publish or disseminate to third parties to enable the third parties to contact the user. In some examples, the user address may include a unique number, such as a telephone number, or a unique name. The association between the user and the devices 70 may be realized as an association between the user address and the devices 70, specifically, a unique device identifier for each of the associated devices 70. In some embodiments, the device 70 to which the system 10 directs communications may be selected by the system 10 based on user preferences.

Each of the devices 70 is capable of communicating with an IP network 50. The IP network 50 may, for example, be a WAN, such as the Internet. The IP network 50 may be a local area network (LAN), a municipal area network (MAN), or a Public IP network (e.g. IP Multimedia Subsystem) in some embodiments. In some embodiments, the devices 70 may reach the IP network 50 via the WLAN 40, WAN 45, WWAN 60, enterprise network 80, NGN 86, and other networks.

In some embodiments, the IP network 50 and the WLAN 40, WAN 45, WWAN 60, enterprise network 80, and NGN 86, may contain SIP elements 52, 42, 47, 62, 84 and 88. SIP elements may include, for example, one or more SIP proxy servers for receiving and forwarding messaging to the devices 70, one or more SIP registrars, location servers, DNS servers, back-to-back user agents, or other such SIP elements. The various networks 50, 40, 45, 60, 80, 86 and SIP elements 52, 42, 47, 62, 84, 88, form a SIP/IP layer interconnecting the devices 70 and other user agents and servers. Alternatively, some or all of the SIP elements 52, 42, 47, 62, 84, 88, may be contained within the IP network 50 (e.g. IP Multimedia Subsystem) and the WLAN 40, WAN 45, WWAN 60, NGN 86 and enterprise network 80 provide IP access to the SIP-enabled IP network 50.

The system 10 includes a communication server 30. The communication server 30 is connected to the IP network 50 and provides converged seamless messaging and session functionality and interoperability over multiple devices. In particular, the communication server 30 includes a control server 32. The control server 32 provides the central logic and control for the communications server 30 and enforces both user preferences and service provider policies. The control server 32 participates in the control over the routing of messaging and the set-up, tear-down and management of sessions with the devices 70. The control server may also store a log of the sessions (session history) or some other network entity may store the session history. Functions of the control server 32 are described in greater detail below.

The communication server 30 also includes media storage 34. The media storage 34 is one or more databases containing stored media data relating to messaging or sessions. For example, the media storage 34 may include session history, messaging content, and metadata relating to content. The media storage 34 may apply privileges associated with a user or a resource. It may support synchronization operations in accordance with an applicable policy with regard to media stored on a client device 70. In one embodiment a client device 70 may send on/off setting information that indicates whether to synchronize media between the device 70 and media storage 34, for example, using SIP PUBLISH method. In another embodiment, the client device 70 may send a request to synchronize media between device 70 and media storage 34 and may receive a response from the server 30, for example, using HTTP request/response or XCAP request/response as specified in RFC 4825. It may also enable user management of media content, including establishment of storage policies and the copying, deleting, uploading, downloading, managing of folders to store media content (e.g. creating, deleting, moving, modifying folders), or other operations with respect to media content.

The communication server 30 further includes user data entity 36. The user data entity 36 may store user data associated with the devices 70. For example, the user data may include associations between a user address and one or more of the devices 70, or identifiers of the devices 70. In many embodiments, a single user address is associated with multiple devices 70. For example, the single user address may be associated with a plurality of unique device addresses specific to the associated devices 70. This enables third parties to contact the user through a single user address without necessarily requiring knowledge of the specific device addresses. In some cases, the user need not have any knowledge of the specific device addresses and may only know his or her unique user address. Additional user-related data and functionality may be implemented in the user data entity 36, such as contact information, media preferences, and user configuration settings. It will also be appreciated that the IP network 50 may store user data associated with the devices 70. It will be appreciated that the control server 32, media storage 34, and user data entity 36 may be implemented in a variety of ways. For example, they may be implemented on separate servers or together on one server.

The communication system 10 may be connected to legacy networks, such as for example PSTN 16, via an interworking entity 14. The interworking entity 14 provides translation services for converting messages and signaling between the legacy network and the communication system 10. For example, in one embodiment the interworking entity 14 is a PBX/IP-PBX connected to the PSTN 16 by primary rate interface (PRI) and to the IP network 50 by IP connection. In that example, voice media is converted from circuit-switched audio on the PSTN 16 side to voice-over-IP (VoIP) on the IP network 50 side by the interworking entity 14. In another embodiment the interworking entity 14 is an IP-SM-GW (IP Short Message Gateway) that is interworking between SIP-based messaging and SMS. Other interworking entities 14 may perform similar translations of IP-based session or messaging data protocols to legacy or proprietary data protocols. For another example, in one embodiment the interworking entity 14 is connected to the communication server 30.

The communication system 10 may be connected to one or more remote communication systems 90 having similar services and functionality. Messaging and sessions may cross multiple systems 10, 90 and the respective control servers 32 may be configured to ensure interoperability of the cross-system communications.

It will be appreciated that the devices 70 are each configured to communicate with the communication server 30 using, for example, SIP compliant messaging. Details of one or more example devices are given below. In general, each device 70 includes a user interface, a processor, memory, and a "client" application for communicating with the communication server 30. The devices 70 may further include messaging applications, multimedia applications, and other applications configured to compose, receive, present, or send messages or sessions with remote users. Example applications may include e-mail applications, instant messaging applications, text messaging applications, video conferencing applications, Push-to-Talk over cellular (PoC), and others.

Initially, the devices 70 each register with a SIP registrar, which may be one of the SIP elements 52 in IP network 50. The devices 70 may directly contact the server 30 to indicate that they are registered. Alternatively the server 30 obtains information about the registration of devices 70 indirectly from the IP network 50 using the third party registration mechanism as defined in 3GPP TS 24.229 and/or the registration event package as defined in RFC 3680. The registration may be performed automatically, e.g. every time the device 70 is powered on or on a periodic basis, or it may occur manually on user selection. In another embodiment, the registration may be performed in response to a request from the server 30, for example if the device 70 is required by the network to re-authenticate. The device 70 may contact the server 30 using a SIP-based message in some embodiments. In response, the server 30 sends a response data signal rejecting, failing or accepting the request. Once registered, the device 70 and server 30 may request information each other using data signals/messages.

As noted above, each user has at least one unique user address. The user address is a single unified contact address for reaching a user on any of his or her devices. In some embodiments, a user address may include a TEL URI (telephone number), SIP URI, SIPS URI, e-mail address, PNP telephone number, GRUU, or other addressing scheme. In one embodiment, the user address is a Public User Identity as defined in 3GPP TS 23.003. Irrespective of the format of the address, each user has two or more devices 70 associated with their user address. In this example embodiment an example user has six associated devices 70a-70f. This association is stored as user preference data in the SIP elements 52 or user data entity 36 of the communication server 30. In particular, in some embodiments, the association is stored as an association between the unique user address and the specific device addresses of each of the associated devices 70a-70f. Accordingly, when the SIP elements 52 or server 30 receive messages or session data addressed to the user address, it is capable of identifying the device(s) 70 and/or device addresses to which the messages or session data may be relayed. The user preference data may specify logic rules or other criteria for determining to which device(s) 70 messages or session data should be sent.

In the present application, the system 10 may include a presence server 96. One or more presence servers 98 may also, or alternatively, be accessible through the remote communication system 90. The server 30 may receive presence information from a source of presence information, such as the presence servers 96, 98. The presence servers 96, 98 may receive presence data from devices connected to the system 10 or the remote communication system 90. The presence data reflects the availability and capabilities of the device and may be associated with a user of the device. In this regard, the presence servers 96, 98 may have defined "presentities", where a presentity is a complete picture of a user's presence status on the network. The presence servers 96, 98 may generate and make available Presence Information Data Format (PIDF) documents or Rich Presence Information Data format (RPID) documents containing presence information for a particular user. Third parties interested in communicating with the particular user may obtain (in some cases, subscribe to) presence data from the presence servers 96, 98 that indicates the availability of the particular user. The availability information may include information regarding the various devices associated with the user and their state of connectivity, the services provided by those devices. Further details regarding presence data models and PIDF and RPID documents may be found in IETF standards, including J. Rosenberg, "A data model for presence", RFC 4479, July 2006 and H. Schulzrinne, "RPID: Rich Presence Extensions to the Presence Information Data Format (PIDF)", RFC 4480, July 2006. In one embodiment, the presence server functionality may be implemented by the communication server 30.

The delivery of messages or session data to the device(s) 70 may be wholly or partly based on presence information. It may also depend on the nature of the messages or session data and the corresponding capabilities of the device(s) 70, as specified for example in predefined logic rules.

When an incoming message is received by the server 30 addressed to a user address, the server 30 may deliver the message or a message notification to one or more of the device(s) 70 based on the message characteristics (e.g. the type of media), the device capabilities, user preferences set in the user data entity 36, and/or presence information. For example, the user preferences for a given user may specify to which of the devices 70a-70f messages or message notifications should be delivered and/or when they should be delivered and when they should be queued for later delivery. By way of another example, the server 30 may deliver a message to a device 70, such as wireless device 70a, containing video only if the device characteristics associated with wireless device 70a indicate sufficient processing speed and display resolution for a reasonable quality of service experience. It will be appreciated that many other factors may be taken into account in determining to which devices(s) 70 messages or message notifications are to be delivered.

The server 30 may also be configured to deliver an incoming session request addressed to the user address to one or more of the device(s) 70. As with messages, the determination of which device(s) 70 are to receive the session invitation may be partly based on user preferences, device capabilities, nature of the media specified in the session request, service provider policy, presence, and other factors.

In one example, a session invitation is sent by a remote party to the server 30 addressed to the user address. The server 30 determines to which device(s) 70 the invitation ought to be directed. It then generates and sends a new session invitation to the identified device(s) 70, such as a SIP INVITE message. The invitation may contain data regarding the remote party. The invitation may be sent simultaneously to more than one of the devices 70, or it may be sent sequentially to more than one of the devices 70 if it goes unanswered at a first one of the devices 70.

On receipt of the invitation, the device(s) 70 alerts the user to the incoming request, for example by audible, visual and/or vibratory indicators, and offers the user the opportunity to accept or reject the proposed session. If the user accepts the session, then the device 70 responds with an acceptance message to the remote party via the server 30, such as a SIP 200 OK message. After the exchange of ACK messages, the session will be initiated over a first leg from the device 70 to the server 30 and a second leg from the server 30 to the remote party. It will be appreciated that the second leg may comprise a number of legs depending on the network architecture between the server 30 and the remote party. The server 30 substantially seamlessly connects the two legs to enable the exchange of media between the device 70 and the remote party.

In another example, a session may be initiated by the user from one of the devices 70. Based on a user request input through a user interface, perhaps using a session-based application program like a video conferencing application, the device 70 generates and sends a session invitation addressed to a remote party. The session invitation is sent to the server 30. The server 30 may assess whether the invitation request conforms to predetermined criteria, including user policies, service provider policies, or other such criteria. If acceptable, then the server 30 sends an invitation request to the remote party. If the session invitation is accepted by the remote party, the server 30 and device 70 complete set-up of the session between the device 70 and the server 30 and the server 30 completes set-up of the session between the server 30 and the remote party. The two legs of the session are substantially seamlessly connected by the server 30 to facilitate conduct of the session application between the device 70 and the remote party.

In these examples, the remote party may be a user/device within the system 10, within a remote communications system 90, or, in some instances, a legacy system like the PSTN 16.

Because the server 30 is involved in routing messages and establishing sessions on behalf of the devices 70, it is capable of providing additional session functionality during an active session. For example, during the progress of an active session, the server 30 permits the device 70 to add or modify media within the session, add additional sessions (e.g. dialogs), etc. Using SIP signaling, the device 70 can send requests to the server 30 and the server 30 can initiate additional sessions, modify existing sessions, and otherwise manage the ongoing sessions.

The sessions may support any number of session-based applications, including VoIP, messaging, Push to Talk (PoC), etc. With respect to VoIP, video-conferencing, or other telephony-type services, the server 30 may support telephony-type functions or operations such as voicemail, universal voice mail notification, answer acknowledgment, extension dialing, session hold and retrieval, DTMF tones, caller ID, callback, call forwarding, call transfer, call waiting, mute, call blocking, call redial, call parking, speed dial, do not disturb (DND), DND bypass list, and DND list, among others.

In accordance with an embodiment, the user data entity 36 of server 30 may specify numerous system-defined user access rights and user modifiable preferences, which can alter the session handling described herein. Referring back to FIG. 1, a system administrator may set user access rights and priorities. The user may use any IP-enabled device capable of accessing the IP network 50 to set numerous user preferences. For example, the user may employ a Web-based or graphical user interface, e.g. a web browser application on a personal computer or mobile device, to access and set user preferences, alternatively XCAP may be used or SIP mechanisms such as SIP Publish or other SIP Methods.

It will be appreciated that the system 10 provides one user address for each user, which has several advantages. The single address may be, for example, the user's physical office extension DID telephone number (TEL URL), the user's SIP URI, SIPS URI, the user's e-mail address, GRUU, or any other such address. This user address will not have to be changed even when the user changes his devices 70. In fact, if a system administrator or other personnel provides the user with a new device (and the number/address of the device is associated with the user address in the server 30), the user may never need to know the actual device address of the new device. The user only needs to remember the user address regardless of which device he/she is using.

In some instances, the system 10 may use a Globally Routed User Agent URI (GRUU) to uniquely identify each device 70 despite the fact that each of a user's devices 70 share a common user address. In the context of SIP, GRUUs are described in J. Rosenberg, "Obtaining and Using Globally Routable User Agent (UA) URIs (GRUU) in the Session Initiation Protocol (SIP)", Internet Engineering Task Force, Jun. 25, 2007 (hereinafter referred to as Rosenberg and hereby incorporated by reference in its entirety). A public GRUU is constructed by adding a "gr" URI parameter to the normal address of record (AOR) or user address. For example, a public GRUU may be: sip:bob@company.com; gr=kdf234rh48fj. A temporary GRUU may be constructed using algorithm in the registrar, and may take the form: sip: lkjwe23423kl324j234j332@company.com;gr. Each device obtains its GRUU from a SIP registrar in the system. In some embodiments, the SIP registrar may be implemented within the SIP elements 52. The user preference information in the user data entity 36 that associates the devices 70 with the user address may include GRUU information.

Another published IETF standard, Rosenberg, J., "A Session Initiation Protocol (SIP) Event Package for Registrations", RFC 3680, March 2004, details mechanisms by which a "watcher" can obtain information from a SIP registrar, including registered contact information. Draft guidelines have been published to detail an extension to the registration event package for obtaining GRUU information from a SIP registrar: Kyzivat, P., "Registration Event Package Extension for Session Initiation Protocol (SIP) Globally Routable User Agent URIs (GRUUs)", Internet Engineering Task Force, Jul. 6, 2007 (hereinafter referred to as Kyzivat and hereby incorporated by reference in its entirety). Together, these documents define SIP protocols for obtaining GRUU information from SIP registrars for an address of record. Accordingly, the server 30 may be configured to use these SIP registration event protocols to obtain GRUU information from SIP registrars within the system 10 regarding the devices 70 associated with a user address. In this manner, the server 30, and in particular the user data entity 36, may obtain up-to-date contact information, including GRUUs, for each of the devices 70 registered with the system 10 and associated with the user address.

The server 30 obtains the GRUUs for each device 70 using the mechanism in "Registration Event Package Extension for Session Initiation Protocol (SIP) Globally Routable User Agent URIs (GRUUs)". The user preferences contain the GRUU or GRUUs to which requests that meet particular criteria should be routed. The Public GRUU contains the user address as well as an identifier in the gr parameter that uniquely identifies the specific device instance.

The user or system 10 can publish this single user address (as opposed to the multiple numbers/addresses associated with the many devices the user can associate with his/her account), for example, in business cards, user profile on a website, telephone directories, etc. In the case of telephony-based sessions, this user address can be placed into the ANI/DNIS information of placed calls, which helps mask the physical telephone number of the device 70 from the other party on the call. More generically, the user address may be reflected in the SIP header information of SIP messages sent from the server 30 to remote parties, thereby masking the contact details of the device(s) 70 participating in the session. This also means that people or organizations attempting to contact the user only require the single user address, which is particularly advantageous.

For dual mode devices, there is often a telephone or contact number associated with the cellular mode of the device and a separate, different address or contact number associated with the data/WiFi mode of the device. When the user is registered with the server 30 the user does not need to know either number. In operation, the server 30 may use the cellular and WiFi modes of the device as two separate interfaces for establishing sessions.

In the example embodiment of FIG. 1, the presence servers 96, 98 may receive presence information relating to the user of the devices 70*a*-70*f*. One of the presence servers, for example presence server 96, may create and maintain a "presentity" detailing the availability of the user. A third party wishing to contact the user may subscribe to the presentity (using a Presentity URI, as described in RFC 4479) so as to obtain up-to-date presence information regarding the user.

In a conventional presence configuration, the presence server 96 might receive presence information directly from the devices 70*a*-70*f*. The devices 70*a*-70*f* may publish their state using, for example, SIP PUBLISH or similar mechanisms. Reference may be made to IETF standard A. Niemi, "Session Initiation Protocol (SIP) Extension for Event State Publication", RFC 3903, October 2004. In this configuration, the presence server 96 independently receives state information for each of the devices 70*a*-70*f* and consolidates this information into presence document(s). The presence server 96 might have a stored association between the user and the devices 70*a*-70*f* and may, on this basis, consolidate the presence information for all the devices into a single presence document for distribution to subscribers. In such a configuration, the presence server 96 operates entirely independently of the communications server 30. This configuration may lead to complications and confusion, as third parties may be provided with excessive detail regarding the actual devices 70*a*-70*f* and their addresses by the presence server 96, whereas the communication server 30 is configured to disguise that detail behind a unified single user address.

In accordance with one embodiment, the communication server 30 may be configured to gather presence data with regard to the various devices 70*a*-70*f* and report the data to the presence server 96. Mechanisms such as SIP PUBLISH may be used by the devices 70*a*-70*f* and the communications server 30 to obtain up-to-date state information for each of the devices 70*a*-70*f*. In this regard, the control server 32 may include a presence manager 38 for receiving state information from the devices 70*a*-70*f* and reporting the state information to the presence server 96.

In order to provide third parties with a unified and simplified view of user availability, the presence manager 38 may be configured to aggregate state information for the various devices 70*a*-70*f* and to report unified or aggregate presence information to the presence server 96, as will be described in greater detail below. In other words, the presence manager 38 gathers state information for a user's devices, aggregates the data to create a unified depiction of the user's availability, and then reports the unified availability information to a presence server 96, 98.

In order to disguise the device details behind the unified availability information, and present a singular unified view of a user's availability, the presence manager 38 or other elements within the communication server 30, defines a "virtual device" associated with the user. The presence manager 38 reports or publishes presence information regarding the "virtual device" associated with the user, rather than presence information for the individual devices 70*a*-70*f*. In a SIP-based implementation, the communications server 30 may be said to be emulating a SIP User Agent having the characteristics and state information of the aggregated user devices 70*a*-70*f*. The presence server 96 is aware only of the "virtual" device associated with the user. Thus, third parties that subscribe to notifications regarding the availability of the user from the presence server 36 are provided with presence data for the "virtual device". This has the added benefit of placing the communications server 30 in control of the state and availability details made available to third parties. This allows the communications server 30 to filter information in accordance with user or administrator preferences, and allows the communications server 30 to route session requests or other messaging based on its policies and preferences, rather than based on a third party's selection of a particular one of the devices 70*a*-70*f*.

The effect of this configuration is that a third party that subscribes to a user's presence information (for example, by including the user on a "buddy list"), will be aware of the user's availability for certain types or classes of communication/service; but not the individual devices 70*a*-70*f* or their addresses on which the user is presently available. From the point of view of the third party, the user has a single device, the service characteristics of which may fluctuate to reflect the user's availability for certain classes of communication services.

Figure 2:
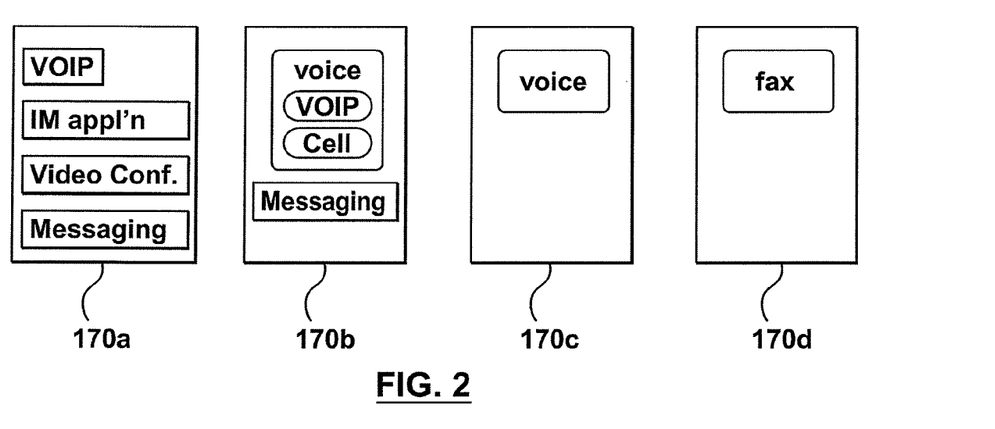
FIG. 2 diagrammatically illustrates one example scheme of aggregation for presence information.

Reference may be made to FIG. 2, which diagrammatically illustrates one example scheme of aggregation in accordance with the present application. An example user may have four associated devices 170*a*, 170*b*, 170*c*, and 170*d*. Device 170*a* may be a personal computer configured to connect to an IP network. The computer may include various software applications, including a voice-over-IP (VoIP) application, an instant messaging (IM) application, a videoconference application, and a messaging application. The messaging application may be an e-mail application, for example.

Device 170*b* may be a dual-mode handheld mobile device configured for voice communications in either WLAN or WAN networks. The device 170*b* may include a voice application (or two separate voice applications) for voice communications. The voice application may be configured to use the cellular interface when the device 170*b* is connected to a WAN, and the VoIP interface when the device 170*b* is connected to a WLAN. In some instances, the voice application may be configured to use VoIP over the WAN connection where IP connectivity can be established. The selection between VoIP or cellular operation and the use of WAN or WLAN connectivity in the case of a dual-mode mobile device will be familiar to those of ordinary skill in the art. The device 170*b* may also include one or more messaging applications, including an e-mail application, SMS application, and MMS application. In some instances, e-mail, SMS and MMS functionality may be provided by a single messaging application; in other instances the functionality may be implemented using separate modules or applications. The various messaging functions may be integrated into a unified messaging user interface on the device 170*b*. The various possible embodiments of a dual-mode mobile device having voice and messaging functions will be understood by those skilled in the art.

Device 170*c* may be a desktop office telephone with basic voice functionality. Device 170*d* may be a fax machine connected, for example, to an enterprise network.

It will be appreciated that the devices 170*a*-170*d* are illustrative examples only and are not intended to limit the scope of the present application to such devices or devices having only these characteristics.

Figure 3:
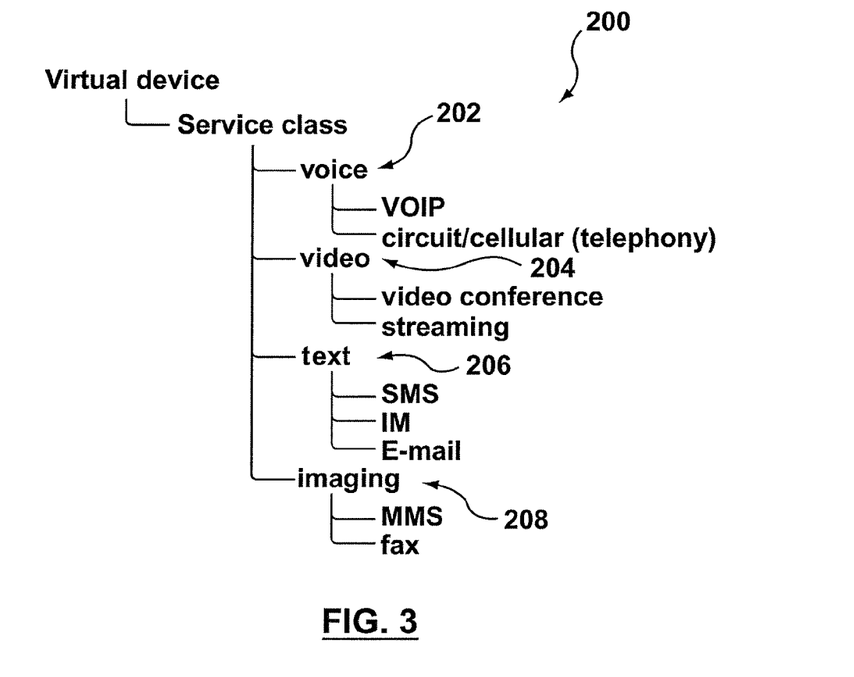
FIG. 3 diagrammatically shows an example classification system for use in aggregating presence information by service class.

FIG. 3 diagrammatically shows an example classification system 200 for use in aggregating presence information by service class. In this example, four service classes are defined: voice 202, video 204, text 206, and imaging 208. The voice service class 202 may include services such as VoIP and conventional circuit-switched telephony. The video service class 204 may include services like videoconferencing and/or videostreaming. The text service class 206 may include text-based communication services such as SMS, IM, and e-mail. The imaging service class 208 may include services such as MMS and facsimile. Additional classes and/or services may be included in the classification system 200.

The classification system 200 abstracts away from specific services to a class of service. In one sense, the service classes 202-208 indicate the nature of the services, but not the specific type of application for providing that service.

Some applications may offer more than one service. For example, a videoconferencing application may be considered to be both videoconferencing and VoIP. The application might also allow for IM on top of the video session. Other example combinations are possible. In this case, a single application may fall into more than one service class. In other words, a device having such an application may be described as offering multiple service classes.

It will be understood that fewer or more classes may be included in other examples, and that different classifications can be used to groups services in a different manner or according to different characteristics.

Figure 4A:
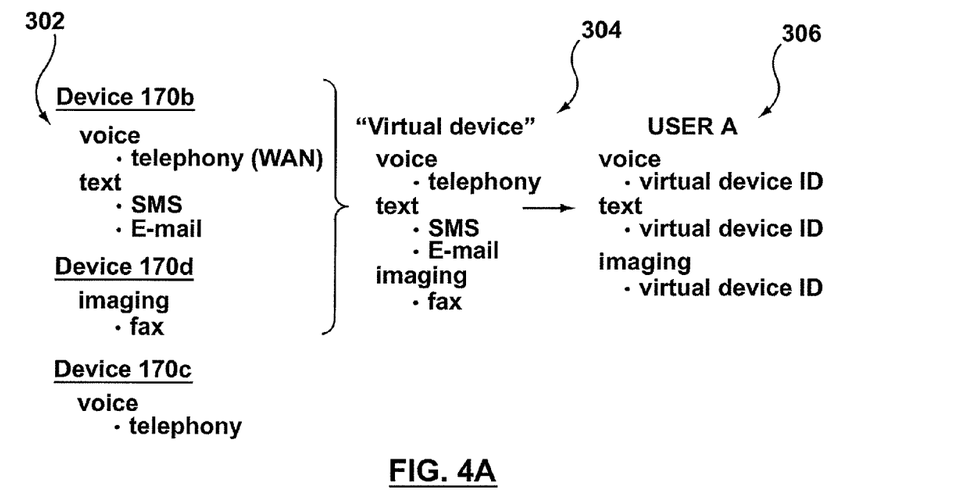
FIGS. 4A and 4B show an example aggregation of device state data into virtual device definitions.
Figure 4B:
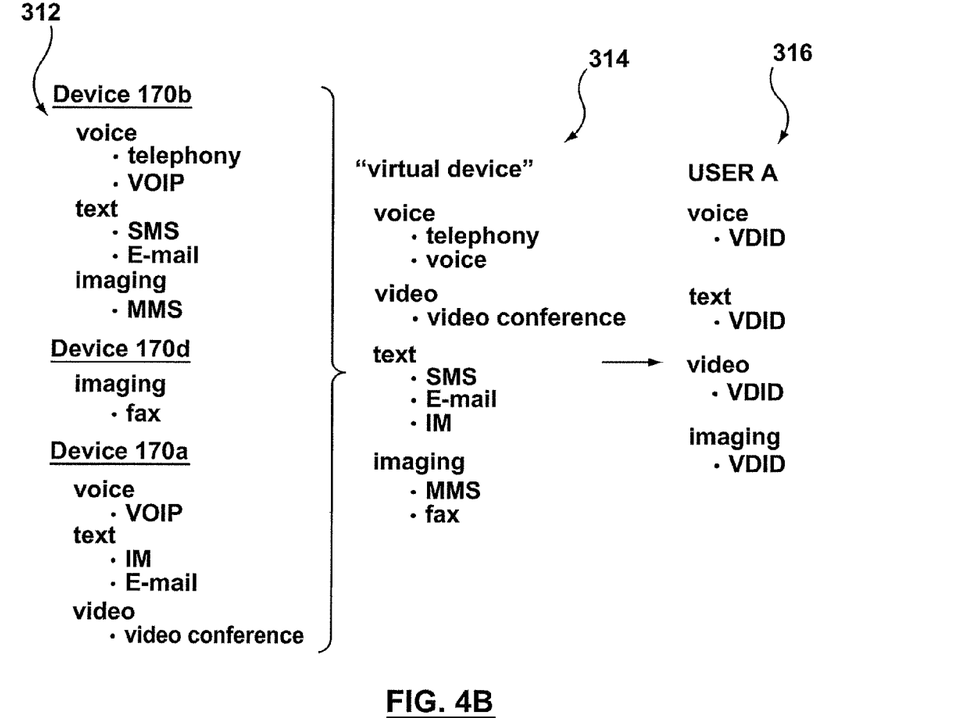

Reference is now also made to FIGS. 4A and 4B. FIG. 4A illustrates an example aggregation of device state data 302 into a virtual device definition 304. In this example, devices 170*b*, 170*d* and 170*c* from FIG. 2 report their presence to the communications server 30 (FIG. 1) and, in particular, to the presence manager 38 (FIG. 1). In some embodiments, the information reported from the devices 170 to the presence manager 38 may include the device's availability (e.g. connected, busy, etc.). In some embodiments, the devices 170 also communicate service information, such as the applications available and/or the service classes available. In other embodiments, the presence manager 38 may already have some information about a device's capabilities or services. For example, the presence manager 38 may obtain stored device service data from the user data entity 36 (FIG. 1).

To illustrate an example, the dual-mode mobile device 170*b* may be connected via a WAN and may report to the presence manager 38 that it has WAN connectivity. From this, the presence manager 38 may, in some embodiments, conclude that the device 170*b* is available for cellular telephony, SMS, and e-mail. To reach this conclusion, the presence manager 38 reads device-specific data from the user data entity 36 that indicates the applications and/or services available on the device 170*b* when the device 170*b* has WAN connectivity.

In another example, the device 170*b* may include its application/service information in its reporting communication to the presence manager 38. For example, it may inform the presence manager 38 that it has voice and text service classes available. In another embodiment, it may inform the presence manager 38 that it is currently available for cellular telephony, SMS and e-mail services.

It will be appreciated that the devices 170 provide some level of information to the presence manager 38 regarding their availability. The presence manager 38 may or may not have stored data regarding each device's capabilities that it may draw on to obtain a more complete picture of the device's capabilities. In any event, the presence manager 38 receives or deduces service availability information for each of the devices 170.

Those ordinarily skilled in the art will appreciated the various mechanisms and processes for developing and reporting presence information. For example, in some instances, GPS-based location information obtained from a user's mobile phone may impact the determination of the "presence" status of home or office equipment (based on the user's proximity to same). The present application is not intended to be limited to any particular type of presence data or information. The data reported from the devices 170 to the presence manager 38 may include any useful information for making presence assessments with regard to the individual devices 170.

The presence manager 38 defines a "virtual device". The virtual device is associated with the user of the devices 170. In this regard the virtual device definition 304 may be stored in memory on the communications server 30 in association with the user, for example by reference to the user address. The virtual device definition 304 includes device capability/availability/willingness information. This "presence" information is created by aggregating the presence information received from the devices 170. In particular, the presence information is aggregated across service classes, thereby developing a unified device picture of service classes available for reaching the user.

For example, with reference to FIG. 4A, if devices 170*b*, 170*d*, and 170*c* all report the presence information listed in the figure, then the virtual device definition 304 contains the aggregated presence information. The aggregated presence information reflects that the user is available for voice, text or imaging services and the user is willing to show such services are available to use. In some cases, the virtual definition may retain the application type, such as SMS or e-mail under the "text" service class or the virtual definition may retain the application type, such as SMS, MMS, PoC or e-mail without any service class. The voice class includes only "telephony", although it will be noted that both devices 170*b* and 170*c* offer a telephony service. Even though there are two types of telephone service (mobile and desktop), the virtual device definition 304 simply indicates that the user is available for voice services.

The virtual device definition 304 may be used by the presence manager 38 to generate a presence document 306 to be published to a presence server, such as presence server 96 (FIG. 1). The presence document 306 includes a unique user identifier, which may be the user address, and service class information. For example, with reference to FIG. 4A, the presence document 306 may indicate that the user is available for voice, text and imaging service classes. In all cases, any device information in the presence document 306 reflects the "virtual device" and not the individual devices 170.

To continue with the example from FIGS. 2 and 4A, reference is now made to FIG. 4B, which shows another example aggregation of device state data 312 into a virtual device definition 314. In this example, devices 170b, 170d, and 170a all report presence information to the presence manager 38. This example reflects a case in which the user is available by way of his or her fax machine 170d, personal computer 170a, and dual-mode mobile device 170b. In this case, the mobile device 170b has WLAN connectivity.

In the example, it is presumed that the dual-mode device 170b requires WLAN connectivity to enable MMS services under the "imaging" service class. It will also be noted that the device 170b is available for both cellular telephony and VoIP voice services due to the WLAN connection. In other embodiments, with other devices, the type of services available may not vary based on the type of network connectivity. The type of network connectivity may be used by the communication server 30 in making decisions as to where to route sessions and messages, whether on a least-cost basis or use other logic rules. Those skilled in the art will appreciated that the differing services illustrated in FIGS. 4A and 4B are for illustrative purposes and are not intended as a limitation of the present application.

Device 170a reports its availability for voice (VoIP), text (IM and e-mail), and video (videoconferencing) service classes.

The presence server 38 aggregates the service class information and, possibly, other presence data to generate the virtual device definition 314. The virtual device definition 314 in this example indicates that the user is available for the services classes of voice, video, text, and imaging. The resultant presence document 316 indicates the user's availability for these services classes. Again, it will be noted that the presence document does not include details of the devices 170 but rather abstracts away that detail and associates the service classes with the "virtual device".

The presence documents 306 and 316 are published to presence servers, such as presence server 96, whereupon updated presence data with regard to the user may be sent to subscribing third parties. By way of example, the presence server 96 may inform the third parties of the user's availability for voice, text, or imaging communications/messages following receipt of the presence document 306. To initiate such a communication, the third party does not need to chose a device to which to direct the proposed communication/invitation. Indeed, details of the available devices 170 are not made public, leaving the third party to direct invitation or other communications to the "virtual device" at the user address. The communication server 30 manages the routing of any such incoming invitations, etc., to the appropriate user device(s) 170 in accordance with its configuration for managing user communications.

Figure 5:
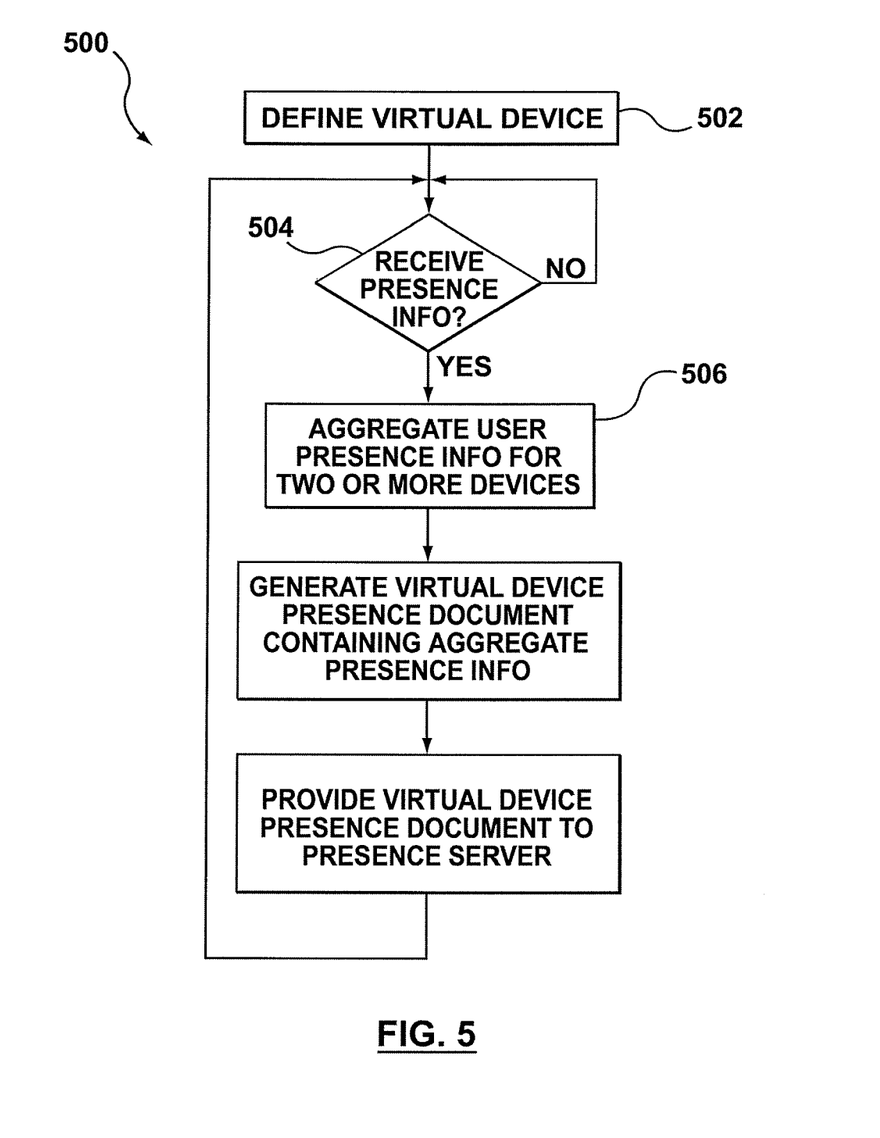
FIG. 5 shows, in flowchart form, a method for aggregating presence information to provide a simplified unified presence.

Reference is now made to FIG. 5, which shows, in flowchart form, a method 500 for aggregating presence information to provide a simplified unified presence. The method 500 begins in step 502, wherein a virtual device definition is created. As described above, the presence manager 38 may generate and store a virtual device definition in association with a user (e.g. a unique user identifier/address). The virtual device definition is configured to store aggregate presence information for the user and, in particular, aggregate service class information.

In step 504, the presence manager 38 may receive updated presence information from one of the user's devices 170. The presence manager 38 may be configured to determine that presence information for a given device 170 is associated with the user based on a link/association between the user and the given device 170. The link/association may be stored in the user data entity 36 in some embodiments.

If updated presence information is received in step 504, then the presence manager 38 aggregates the user presence information with presence information already received from the user's other devices 170 (if any), as shown in step 506. The presence manager 38 may, in one embodiment, store the most up-to-date presence information received from each device 170 in a memory or database and may separately maintain the virtual device definition containing the aggregation of presence information. In other words, in such an embodiment the presence manager 38 may have the most recently received presence information from each device 170 stored. This may permit the presence 38 manager to apply time-outs or other such mechanisms for determining when presence information for a particular device 170 is stale and should be considered inaccurate. Stale presence information may be dealt with by discarding the information and presuming the device 170 is offline or out-of-service, or by sending a request for a presence update to the device 170. It will be appreciated that the stale-dating of presence information may result in the presence manager 38 updating the aggregated device information, as reflected in steps 506-510, as described herein.

In step 508, having aggregated the presence information from the individual devices 170 into aggregate virtual device presence information, the presence manager 38 generates a virtual device presence document containing at least some of the aggregate presence information. In particular, the presence document contains at least service class information indicating the services classes for which the user is available, and/or the user's availability status for each service class. The presence document also includes a user identifier, such as the user address.

The presence document is published or transmitted to the presence server 96, as indicated in step 510. This provides the presence server 96 with a status update regarding the user, thereby enabling the presence server 96 to send/publish presence information to subscribing third parties with regard to the user.

Certain adaptations and modifications of the described embodiments can be made. Therefore, the above discussed embodiments are considered to be illustrative and not restrictive.

What is claimed is:

1. A method of providing simplified presence for a user, the user having a plurality of associated communication devices and being registered with a communications server, each communication device enabling at least one communication service class, the communications server having a user data entry associating the user with each of the plurality of communication devices, the method comprising:

defining a virtual device associated with the user;
receiving, at the communications server, presence information from at least two of the plurality of communication devices;
aggregating the received presence information, the aggregated presence information indicating the service classes available from the aggregated at least two communication devices based on the received presence information, wherein at least two of the communication devices have at least one service class in common;
generating a virtual device presence document containing the part of the aggregated presence information indicating the service classes available and excluding details of the at least two communication devices, wherein the details of the at least two communication devices include the addresses of those devices; and
providing the virtual device presence document to a presence server as presence information associated with the user.

2. The method claimed in claim 1, wherein the step of defining includes creating a virtual device definition associated with a user address.

3. The method claimed in claim 1, wherein the step of receiving includes identifying the user based on the user data entry associating the user with the communication devices.

4. The method claimed in claim 3, further including a step of storing the received presence information in association with the user.

5. The method claimed in claim 3, wherein the step of aggregating includes identifying the virtual device definition based on the association between the user and the virtual device.

6. The method claimed in claim 1, wherein the step of generating includes filtering device-specific data from the presence information.

7. The method claimed in claim 1, wherein the step of receiving comprises receiving updated presence information from at least one of the plurality of communication devices, and wherein the step of aggregating includes aggregating the updated presence information with previously received presence information from the at least two communication devices other than the at least one communication device.

8. A communications server for providing simplified presence for a user, the user having a plurality of associated communication devices, each communication device enabling at least one communication service class, the communications server comprising:
a network interface for connecting the server to an IP network;
a memory storing a user data entry associating the user with each of the plurality of communication devices, and storing a virtual device definition in association with the user;
a processor; and
a presence manager executable by the processor and configured to
receive presence information from at least two of the plurality of communication devices,
aggregate the received presence information, the aggregated presence information indicating the service classes available from the aggregated at least two communication devices based on the received presence information, wherein at least two of the communication devices have at least one service class in common,
generate a virtual device presence document containing the aggregated presence information indicating the service classes available and excluding details of the at least two communication devices, wherein the details of the at least two communication device include the addresses of those devices, and
provide the virtual device presence document to a presence server as presence information associated with the user.

9. The communications server claimed in claim 8, wherein the virtual device definition is stored in the memory in association with a user address.

10. The communications server claimed in claim 8, wherein the presence manager is configured to identify the user associated with received presence information based on the user data entry associating the user with the communication devices.

11. The communications server claimed in claim 10, wherein the memory includes the received presence information stored in association with the user.

12. The communications server claimed in claim 10, wherein the presence manager is configured to identify the virtual device definition based on its association with the user.

13. The communications server claimed in claim 8, wherein the presence manager is configured to generate the virtual device presence document by filtering device-specific data from the presence information.

14. The communications server claimed in claim 8, wherein the presence manager is configured to receive updated presence information from at least one of the plurality of communication devices, and to aggregate by aggregating the updated presence information with previously received presence information from the at least two communication devices other than the at least one communication device.

15. The method claimed in claim 6, wherein filtering includes excluding device addresses from the virtual device presence document.

16. The communications server claimed in claim 13, wherein the presence manager is configured to filter device-specific data by excluding device addresses from the virtual device presence document.

* * * * *